United States Patent [19]

Notsuki et al.

[11] 4,010,714
[45] Mar. 8, 1977

[54] SYSTEM FOR MANAGING MILKING-COWS IN STANCHION STOOL

[75] Inventors: Iwao Notsuki, Narashino; Katsumi Ueno, Chiba, both of Japan

[73] Assignee: Director, National Institute of Animal Industry, Aobacho, Japan

[22] Filed: Feb. 27, 1975

[21] Appl. No.: 553,894

[30] Foreign Application Priority Data

Mar. 8, 1974 Japan .............................. 49-26844
Mar. 8, 1974 Japan .............................. 49-26845

[52] U.S. Cl. ............................................ 119/14.03
[51] Int. Cl.² ........................................ A01J 3/00
[58] Field of Search ........... 119/14.11, 14.04, 14.1, 119/14.03, 14.05, 14.14, 14.27, 14.01, 14.02

[56] References Cited

UNITED STATES PATENTS

| | | | |
|---|---|---|---|
| 2,470,979 | 5/1949 | Duncan | 119/14.14 |
| 3,402,699 | 9/1968 | Cain | 119/14.11 |

*Primary Examiner*—Louis G. Mancene
*Assistant Examiner*—Peter K. Skiff
*Attorney, Agent, or Firm*—Martin A. Farber

[57] ABSTRACT

A system for managing milking-cows in stanchion stool for milking by which a cow is situated on a floor with her body being fixed in a standing position by supporting members and her neck being restricted in vertical movement by means of stoppers, with teatcups rising on the floor between the cow legs and fitted to her teats. The teatcups are individually set in predetermined positions, according to the peculiar teat positions of the cow.

8 Claims, 7 Drawing Figures

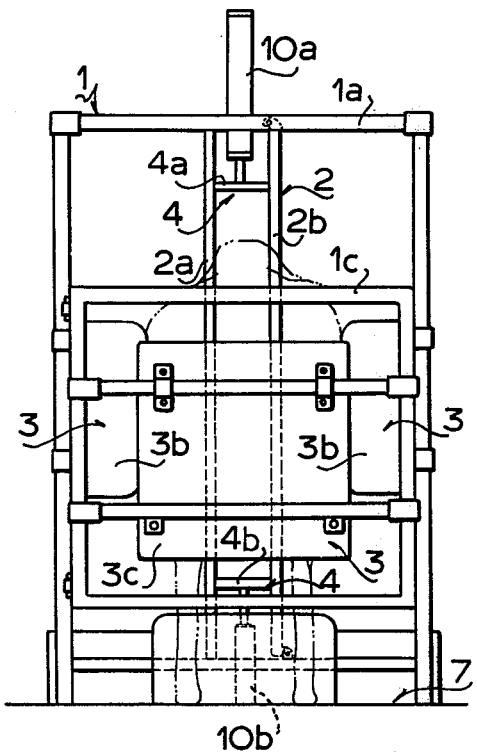
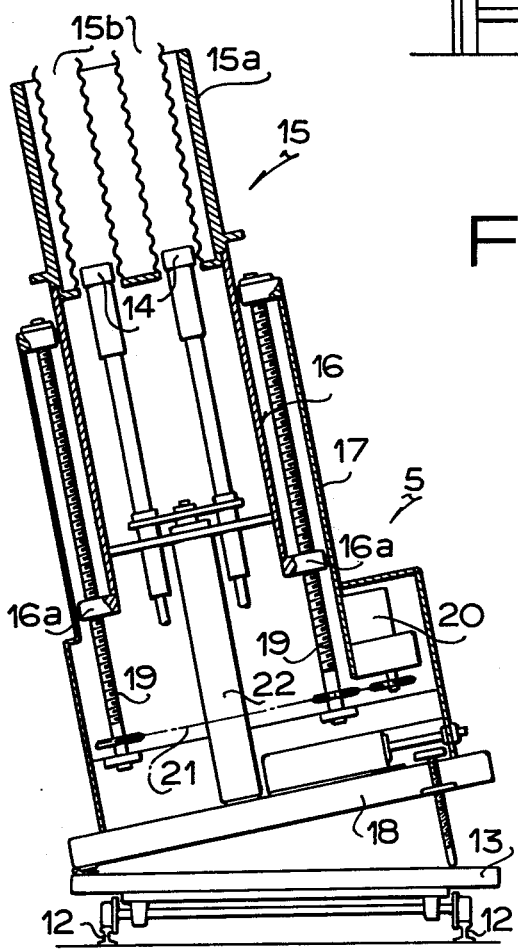
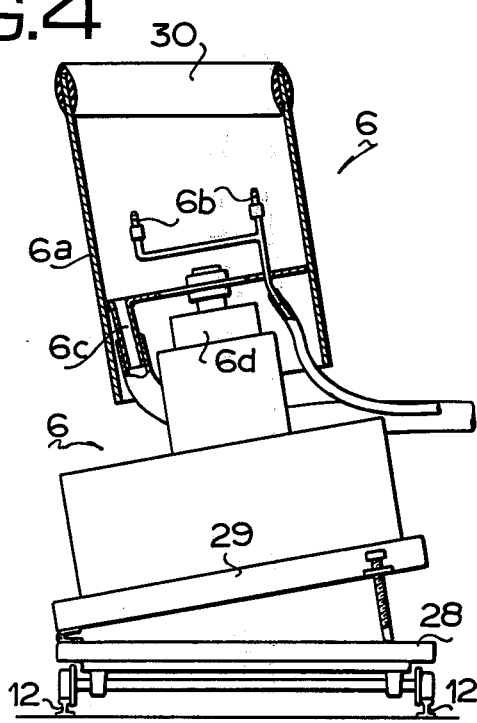

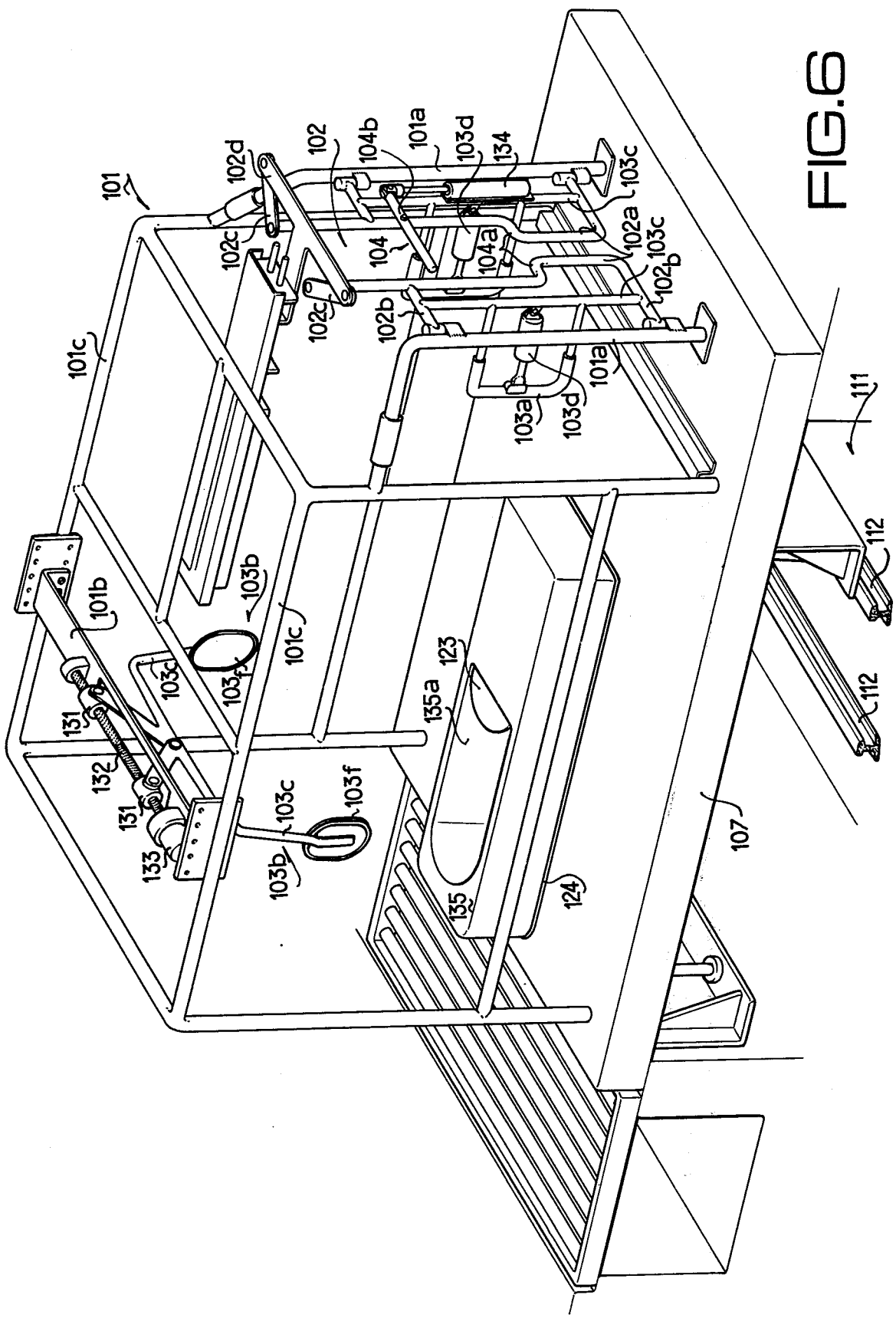

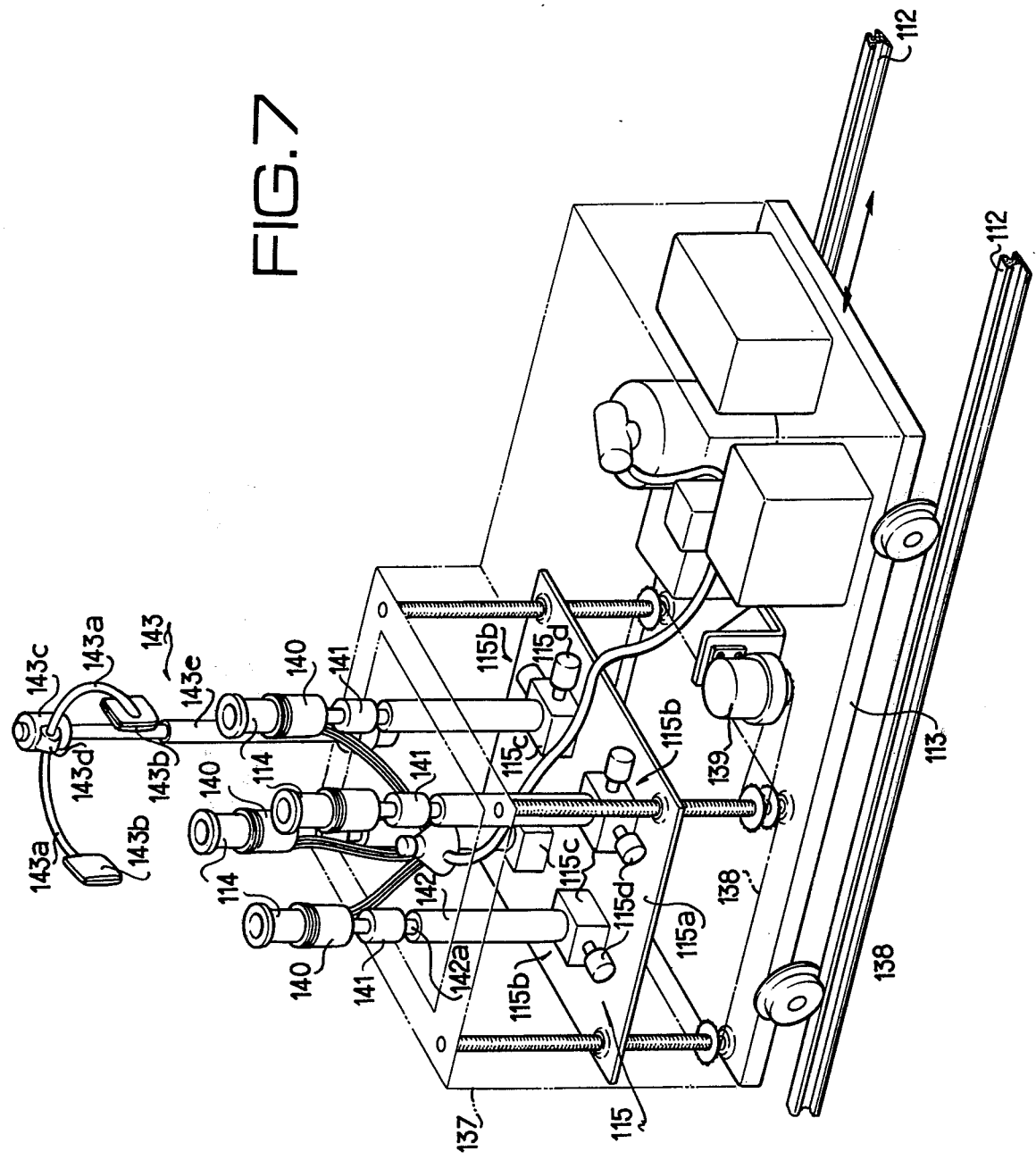

SYSTEM FOR MANAGING MILKING-COWS IN STANCHION STOOL

DETAILED DESCRIPTION OF THE INVENTION

This invention relates to a system for managing milkingcows in stanchion stool, and more particular to an improvement for milking operation.

The prior milking operation is performed in semiautomatic manner by including at the first stage the manual connection of teatcups to the cow udder. In order to engage the teatcups to and disengage them from the cow teats, it is necessary to provide one operator for several cows. Therefor, it is highly desired to perform the milking operation by total automatic control, for instance, by means of standing the cow on the floor, raising the teatcups on the floor, and fitting them to her teats. This performance includes two problems, one of which is a difficulty for fitting a milking device to those cow teats which have peculiar positions for each cow, and the other of which is a difficulty for providing the milking device with access to the cow udder because the position of the udder change by her different posture.

An object of this invention is to provide a system for managing milking cows in stanchion stool which is so improved as to set the cow udder in a place, by means of fixing the cow body in a standing position, restricting the vertical movement of the cow neck in a stanchion member and raising the teatcups among the cow legs, thereby to automatically fit the teatcups to the cow teats. In this case, the teatcups are previously adjusted in positions respectively determined according to the peculiar teat positions of the cow.

The second object of this invention is to provide a system for managing milking-cows in stanchion stool including a device which is simple and adjustable for inducing the teatcups to the teat positions of the cow to be milked.

The third object of this invention is to provide a system for managing milking-cows in stanchion stool including a device which is adjustable or capable of being computed for previously setting the teatcups according to the peculiar teat positions of the cow to be milked.

The fourth object of this invention is to provide a system for managing miling-cows in stanchion stool including a device for washing the cow udder used before the milking operation which is performed by total automatic by means mentioned above as the features of this invention.

In this case, the washing device is replaceable by a milking unit including the teatcups mentioned above.

The other features and advantages of this invention will be apparently understood from the following description with reference to the accompanying drawings as follows:

FIG. 2 is a backside view of the pen of the embodiment shown in FIG. 1;

FIG. 3 is a cross-sectional side view of the milking device of the embodiment shown in FIG. 1;

FIG. 4 is a cross-sectional side view of a device for washing the cow udder used alternately to the milking device mentioned above;

FIG. 6 is a perspective view of a pen frame and accessaries included in the system shown in FIG. 5; and FIG. 7 is a perspective view of the milking unit shown in FIG. 5.

Figure 1:
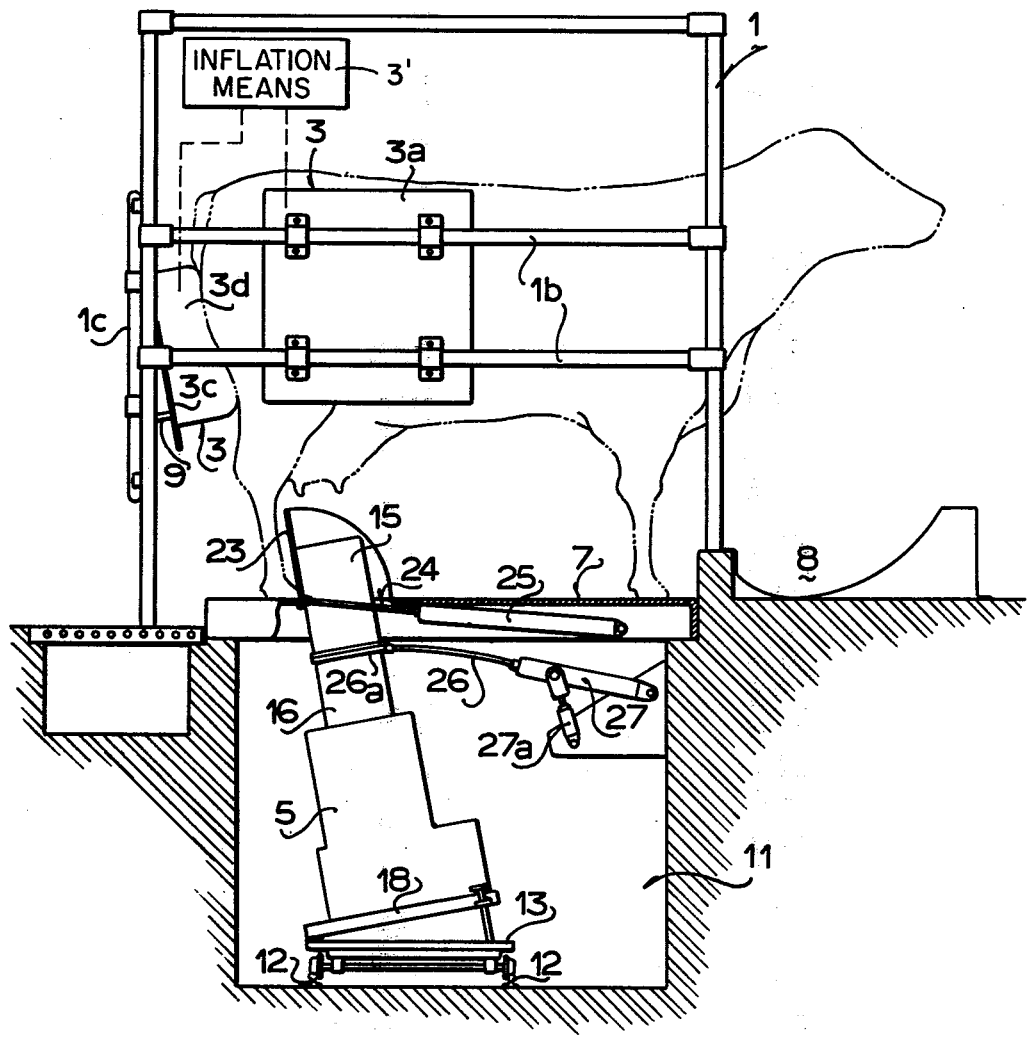
FIG. 1 is a side view of a cow-managing pen with a milking device embodying this invention.

FIGS. 1 to 4 indicate an embodiment of this invention in which there are provided a stool frame 1, a stanchion member 2, a plurality of support members 3, stoppers 4 and a milking unit 5. A washing unit 6 is used alternately to the milking unit 5.

The stool frame is made of pipes and surrounds a floor 7 in a square. The stool frame includes forward crossbeams 1a, side crossbeams 1b and a pipe door 1c hinged to one side column thereof at the backside portion.

The stanchion member 2 consists of two columns 2a and 2b with slide grooves extending in a vertical direction and facing each other. The column 2a is fixed at its ends to the cross-beams 1a, and the column 2b is pivoted to the upper one of the crossbeams 1a and locked to the lower one, so that a cow is kept in the stool frame 1 with her head projecting out of the stanchion member 2. A feeder or manger 8 is disposed in front of the stool frame 1.

The support members 3 include supporting plates 3a which are secured to the crossbeams 1b, and air bags 3b which are attached to the supporting plates 3a and expansible by inflation with air, so that the air bags 3b are forcedly brought in contact with both sides of the cow body, for instance, her lower abdomen, with the cow being situated in a standing position. An inflation means 3' is provided for inflating the air bags 3b, as shown in FIG. 1 of the drawings. The support members 3 further include a supporting plate 3c secured to the crossbeams of the pipe door 1c, and an expansible air bag 3d attached to the supporting plate 3c. The supporting plate 3c is adjustable by means of a bolt screw or bolt screws 9 in accordance with its setting angle, and by inflation the air bag 3d is brought in contact with the hip back of the cow.

The stoppers 4 consist of two upper and lower bars 4a and 4b which are set in the stanchion member 2 with their ends being slidable in the grooves of the columns 2a and 2b, and which are vertically movable by means of actuators 10a and 10b, so that the vertical movement of the cow neck is restricted by the stoppers 4 and then her udder is situated in a prearranged place.

A pit 11 is formed in the ground and extends under the floor 7. On the bottom of the pit 11, a pair of rail members 12 are provided which bear a carriage 13 capable of travelling on the rail members 12. The milking unit 5 is set on the carriage 13, and has four teatcups 14. A guiding means 15 for setting the teatcups 14 individually in predetermined positions is supported by a hereinafter described device. In practice, the guiding means 15 includes a rising head 15a formed into a bucket having an annular shield wall and a flat bottom plate, and four flexible guide tubes 15b surrounded by the annular wall, and upwardly extruded from the bottom plate. Each guide tube 15b is manually deformable and bent so as to align the upper openings with the teat positions of a cow. The teatcups 14 are guided by the guide tubes 15b to the cow teats. The guide tube is made of a steel member which is helically wound so as to be formed into a flexible tube having a hardness and strength sufficient to hold its form in guiding the teatcup and a flexibility permitting it to be manually bent, respectively.

A cylindrical member 16 is slidably supported in a hollow cylinder member 17 mounted on a base frame 18 assembled with the carriage 13, and is shifted up and down by means of threaded shafts 19 which are screwed to threaded receivers 16a integrally formed on the lower end of the cylindrical member 16 and which are driven by an electric motor 20 via a chain transmission device 21. The cylindrical member 16, when rising, is capable of joining abuttingly against the bottom edge of the rising heat 15a. A piston-cylinder assembly 22 is disposed on the base frame 18 so as to move the teatcups 14 in a vertical direction by means of hydraulic or oil pressure.

A trap door 23 is hinged to the edge of an opening 24 formed on the floor 7, and is turned by an actuator 25 consisting of a piston-cylinder assembly.

A supporting rod 26 is connected to an actuator 27 which is disposed together with a lifter 27a in the upper portion of the pit 11 and is positioned under the floor 7. The supporting rod 26 has a fork member 26a which supports an annular flange formed on the lower portion of the rising head 15a, so that the guiding means 15 may be raised and lowered, passing through the opening 24 by operation of the actuator 27 and lifter 27a.

The guide rail members 12 bear a carriage 28 capable of travelling on the rail members 12 so as to be set under the floor 7 alternately to the carriage 13. With the carriage 28 there is assembled a base frame 29 on which is mounted a washing unit 6.

The washing unit 6 includes a basin 6a, a nozzle or nozzles 6b for a water-jet disposed on the bottom of the basin 6a, a drain 6c and means 6d for raising at least the basin 6a and the nozzle or nozzles 6b. The basin 6a has a diameter sufficient to put the cow udder therein, and includes an annular rubber mat 30 softly touching the surface of her udder. The nozzle or nozzles 6b are directed to the cow teats so as to pour water on and wash the surface of her udder.

The rising means 6d may consist of a lifter driven by oil pressure. A brush or brushes may be disposed in the basin 6a and rub the udder, to stimulate the cow and then move her into natural condition.

In operation, by sending sound signals, the cow stands and has access to the feeder 8 in a conditioned reflex, and then the forage is supplied. In this condition, the air bags 3b and 3d are expanded by enflation with compressed air, so as to clamp and keep the cow body in a standing position. When the cow takes the forage, the stoppers 4 are slided in the grooves by the actuators 10a and 10b so as to restrict the vertical movement of the cow neck, thereby to set her udder in a prearranged position, for example, above the opening 24.

The washing operation is first performed before the milking operation, in practice, by the above-mentioned washing unit 6. The trap door 23 is opened by the actuator 25, and the basin is shifted upwardly by the operation of the lifter 6d until the mat 30 is brought in contact with the cow udder, so as to induce the udder in the basin 6a. The pressure water supplied to the nozzle or nozzles 6b pours on the surface of the udder and washes the udder. This water may be adjusted at a suitable temperature.

In the case where the brush or brushes are provided, the rubbing operation causes the cow udder to clean up and stimulates the cow to induce her into natural condition. Preferably, the water-cleaning may continue for a time of 20 to 30 seconds. The udder is dried by means of a dryer or naturally. After washing, the water-jet is stopped and the basin is lowered by the actuator 6d. The carriage 28 travels so as to change its position for the milking unit 5. After the washing unit 6 is replaced by the milking unit 5, the rising head 15a is moved to the position under the opening 24 by the operation of the actuator 27 and is raised through the opening 24 by the operation of the lifter 27a. The driving of the motor 20 causes the shafts 19 to rotate, so that the member 16 is shifted upwardly and the member 16 engages the bottom of the head 15a. Thereafter the teatcups 14 are raised to the udder by the piston-cylinder assembly 22 and fitted to the cow teats respectively.

In this embodiment, there is provided a near-by switch not shown in the drawings and the switch is attached to the top of the teat-cups so as to stop or cease the rising movement of the teatcup when it is brought in contact with the cow udder. After the complete connection of all the teatcups, the vaccum passage of the milker is opened so as to start the milking operation. During the milking operation, a device for automatically measuring the milk-weight is actuated and records it. The milk is supplied to a prescribed place. When the flow rate of the milk is reduced less than 100g per 30 seconds, a detector catches the signal of the flow capacity and informs the operator of the end of the milking, and the milking operation is changed in a final step which includes a machine-stripping such as lowering of the teatcups, whereby the remaining milk in the cow udder due to the teatcups creeping up, is removed in a suitable timing which accords to the sucking pulse of the milking operation. The machine-stripping is continued for about 30 second, and thereafter the vaccum passage is closed. The teatcups 14 are downwardly shifted through the guide tubes 15b by the lowering operation of the piston-cylinder assembly 22 until they are induced into a place defined under the bottom plate of the rising head 15a, and then the member 16 is shifted down by means of threaded shafts 19 mentioned above in the cylinder member 17 and permits the milking unit 5 with the carriage 13 to travel along the rails away from the under position of the opening 24. Finally, the actuator 27 is operated together with the lifter 27a in reverse so as to lower and transversely carry the rising head 15a and then the trap door 23 shuts the opening 24 by the operation of the actuator 25.

The stoppers 4 are operated with the upper bar 4a being shifted upwardly and the lower bar 4b downwardly, and the air bags 3b and 3d are deflated so as to leave the cow in the free condition without the bridle restriction of the cow head.

In this embodiment, the trap door may be attached to a box-form which is capable of rising up on the floor through the opening 24 so that the cow wonders and dislikes touching her legs to the stand moving or projected on the floor, thereby to cause her legs to be astride of the stand in a manner to be away from the stand. In this case, it insure the projection of the teatcup-guide among the legs to the udder. Such stand is indicated in another embodiment mentioned hereinafter, though the trap door is replaced by a slide door moved along the top plate of the stand.

Although, this embodiment includes a teatcup-guide means 15 for each stool frame, the teatcup-guide means may be assembled with the rising device for the teatcups 14 mounted on the carriage 13, if the cows in the stools arranged in the common pit 11 have their teats in the identical positions in connection with the milking unit.

Figure 5:
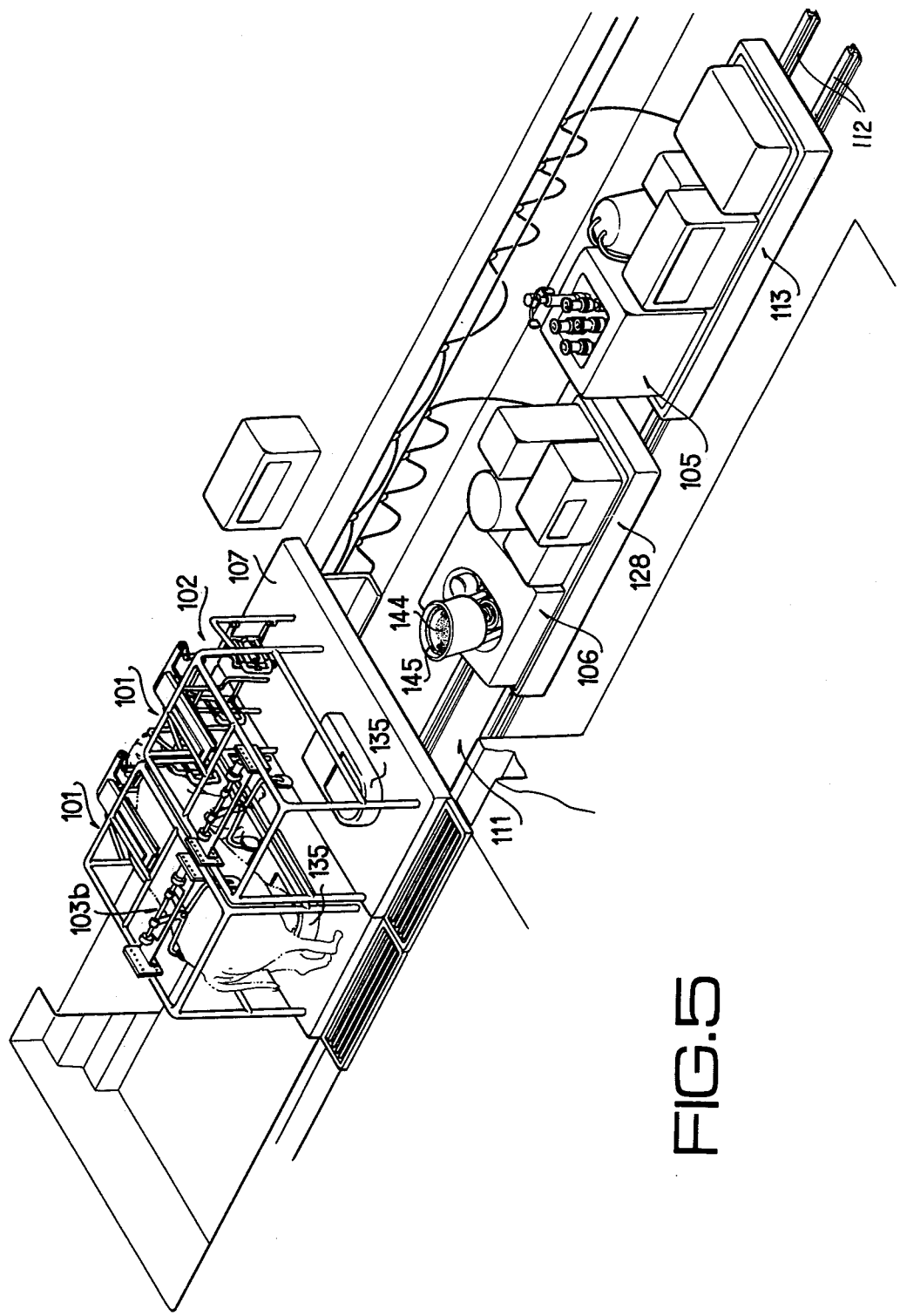
FIG. 5 is a perspective view of washing and milking systems performed in another embodiment of this invention.

FIGS. 5 to 7 indicate another embodiment of this invention in which there are provided a plurality of stools arranged in a row. Each of the stools comprises a stool frame 101, a stanchion member 102, a plurality of support members 103, stoppers 104 and a milking unit 105. A washing unit 106 is used alternately to the milking unit 105 in the same manner as mentioned in the first embodiment.

The stool frame is substantially made of pipes and surrounds a floor 107 in a square. The stool frame includes stanchionsupporting columns 101a, and a ceiling plate beam 101b extending between the upper portions of side frame members 101c.

The stanchion member 102 consists of two crooked columns 102a having arms 102b hinged to the supporting columns 101a respectively. To the tops of the columns 102a are rigidly attached levers 102c which are pivoted to the ends of an actuator member 102d formed into a T-shaped plate. The actuator member 102d is usually locked to the ceiling beam of the stool frame, so that a cow is kept in the stool frame 101 with her head projecting out of the stanchion member 102, and when released, is capable of being moved forwardly so as to turn the arms 102b whereby the stanchion member 102 opens with a result that the cow is free from moorage.

The support members 103 include two members 103a for pushing the cow shoulders, and two members 103b for pushing the upper portions of the cow hipbones. The pushing members 103a are constituted by U-shaped pipes and supported to stems 103c vertically extending between the upper and lower arms 102b. The pushing members 103a are rearwardly moved along a horizontal line by means of piston-cylinder type actuators 103d so that the cow shoulders are pushed by the members 103a and then the cow body is settled in a prearranged position. The members 103b are assembled in a clamper having two arms 103e mutually pivoted at a medium position, and disc pads 103f attached to the lower ends of the arms 103e. The upper ends of the arms 103e are pivoted to nuts 131 screwed in opposite turns to threaded portions formed on the periphery of a shaft 132, which is rotatably supported on the plate beam 101b and driven by an electric motor 133 secured to the stool frame, so that when the shaft 132 is driven, the nuts 131 are carried toward to or away from each other.

The stoppers 104 consist of a static or lower member 104a formed by the crooked portions of the columns 102a, and a movable or upper member 104b formed by a lever pivoted to one of the columns 102a and extending across an interval between the columns 102a. The upper member 104b is capable of swinging by the aid of a piston-cylinder type actuator 134. When the free end of the upper member 104b is lowered by the operation of the actuator 134, the vertical movement of the cow neck is so restricted as in the first embodiment, and then her udder is situated in corporation with the shoulder-pushing operation exactly in a prearranged position. The precision of the udder position is improved by the disc pads 103f pushing the upper portions of the cow hipbones. The pushing of the disc pads also causes the cow to stand with her legs apart.

A box-shaped stand 135 is disposed under the floor 107 and capable of being shifted upwardly through an opening 124 formed on the floor 107. The stand 135 has an opening 135a on the top plate and a slide door 123 movable along the top plate so as to shut or open the opening 135a. The slide door 123 may be operated by means of an actuator not shown in the drawings.

A pit 111, rail members 112 and carriages 113 and 128 for the milking unit and the washing unit are the same as those of the first embodiment.

The milking unit 105 is set on the carriage 113 and capable of rising on the pen floor 107. The milking unit 105 includes a plurality of teatcups 114 and means 115 for setting the teatcups individually in predetermined positions. In this embodiment, the setting means 115 consists of a rising table 115a, four rising heads 115b for respective teatcups 114, and means for adjusting set points of the rising heads respectively in a manner to be situated at a place determined on the table 115a by the latitude and longitude in accordance with the peculiar teat positions of a cow. For such adjustment, there may be provided a static block 115c according to each of the teatcups 114 fixed on the table 115a and a pair of pulse-motors 115d arranged perpendicular to each other in accordance with each block, so as to shift the teatcup on the table plane.

The table 115c has its corners screwed to four threaded shafts 136 which are rotatably supported on bearings by vertically standing in a box-shaped cover 137 and driven via a chain transmission device 138 by an electric motor 139. The rotation of the shafts 136 causes the table 115c to be shifted upwardly or downwardly. The teatcup 114 is disposed on an auto-return arm 140 with a near-by switch (not shown) which is connected to the top of a vibrator 141 attached to a piston rod 142a included in a piston-cylinder type lifter 142. The lifter 142 is disposed on the block 115c and adjusted in a prearranged position on a plane by the pulse-motors 115d. Accordingly, the teatcups 114 are shifted upwardly or downwardly by the operation of the lifters 142, and the pulse-shafts 136.

The milking unit 105 further includes a machine-stripper 143 having a bow-shaped arm 143a, massage pads 143b attached to the ends of the arm 143a and capable of softly clamping the cow udder, a head member 143c supporting the center portion of the arm 143a, an air-pressure switch 143d (this switch is turned when the breast access to an air-jet nozzle increases the resistance against the air flow), and a piston-cylinder type vibrator 143e movable in a vertical direction.

The washing unit 106 includes a large diameter rotary brush 144 and an annular tube for the water-jet referred by a number 145 and disposed in the upper portion of the basin along the periphery thereof, the annular tube having a plurality of nozzle holes at the inner side surface of the circular line.

The other parts of the washing unit 106 are the same as or identical with those of the first embodiment.

In operation, by sending sound signals, the cow stands and has access to the feeder (not shown) in a conditioned reflex, and then the forage is supplied. In this condition, the upper member 104b is lowered to restrict the vertical movement of the cow neck, the pusher members 103a are brought in contact with the cow shoulders, and the disc pads 103f push the upper portions of the cow hipbones, so that the cow is settled on the floor in a prearranged position, with her body being fixed and standing with her legs apart. Consequently, the stand 135 is lifted up on the floor between her legs, the pushing of the pads 103f is slightly released, and the guide door 123 slides to open the opening 135a.

The washing operation is performed similar to that of the first embodiment, in addition of the brush-cleaning up. The washing operation is continued for a suitable time, and consequential to the removing operation.

After the washing unit 106 with the carriage 128 is replaced by the milking unit 105 with the carriage 113, the table 115a is upwardly shifted and the lifters 142 raise the teatcups 114, so that the teatcups 114 are carried among the cow legs and then fitted to her teats respectively. In this case, the teatcups 114 are previously set in prearranged positions determined according to the teat positions of a cow. The data of the cow teat positions may be set in a control device for defining the teatcup positions which supplies a signal to the pairs of pulse motors 115d for respective teatcups.

When the teatcups fit on the cow teats, the near-by switches of the arms 140 catch the contact signals of the teatcups and feed back a signal to the control device so as to cease the lifting-motion of the table 115a and lifters 142.

The vacuum milking operation and the automatic measurement for milk flow rate are performed until the milk flow rate is reduced below a prescribed value.

At the final stage, the massage pads 143d are vibrated by the vibrator 143e so as to remove the remaining milk from the cow udder. The table 115a and teatcups 114 are lowered by the pulse-shafts 136 and lifters 142 driven in reverse, and then the slide door 123 shuts the opening 135a and the stand 135 is lowered under the floor 107 until the top surface of the stand 135 reaches to the floor surface in a plane.

In their embodiment, a milk tank, a pulsator, a carriage driving unit, etc., may be provided on the carriage 13 or 113. The teatcups 14 or 114 shall be sterilized after the milking operation.

What is claimed is:

1. A system for managing milking-cows in stanchion stool comprising
   a stool frame,
   a stanchion member means for projecting the head of the cow therethrough.
   a plurality of support member means secured to the stool frame for setting the body of the cow in a standing position,
   stopper means for restricting the vertical movement of the neck of the cow, and
   a milking unit set under the floor and capable of rising through a trap door disposed on the floor, said milking unit having a plurality of teatcups and means for raising the teatcups and means for stopping the raising of the teatcups so that the teatcups are fitted to the respective teats.

2. A system for managing milking-cows in stanchion stool claimed in claim 1 in which the support members are forcedly brought in contact with both sides of the lower abdomen and the hip back of a cow.

3. A system for managing milking-cows in stanchion stool claimed in claim 2 in which the support member means comprise air bag means secured to the stool frame and inflatable for being brought in contact with the cow body, and there is additionally provided means for inflating the air bag means.

4. A system for managing milking-cows in stanchion stool claimed in claim 1 in which the support member means are forcedly brought in contact with both front sides of the shoulders and the upper portions of the hipbones of a cow.

5. A system for managing milking-cows in stanchion stool claimed in claim 1 in which said means for stopping the raising operation of the teatcups comprises an electrical detecting means which is capable of detecting the engagement of the teatcups with the teats and for stopping said means for raising the teatcups.

6. A system for managing milking-cows in stanchion stool claimed in claim 1 in which there is provided a means for washing the cow udder which comprises a basin, at least one nozzle means for providing a water-jet and disposed on a bottom of the basin, drain, means for draining said basin, and means for raising at least the basin and the nozzle means, and means for replacing said washing means with the milking unit, said basin having a diameter sufficient to put the cow udder therein, said nozzle means being directed to the teats so as to pour water on and wash the surface of the udder.

7. A system for managing milking-cows in stanchion stool claimed in claim 6 in which there is further provided means for brushing the breast in order to stimulate the cow and then move her into natural condition.

8. A system for managing milking-cows in stanchion stool claimed in claim 6 in which there is further provided means for drying to the udder with dry air after washing.

* * * * *